US012591447B2

(12) United States Patent
Couture et al.

(10) Patent No.: US 12,591,447 B2
(45) Date of Patent: Mar. 31, 2026

(54) HARDWARE APPARATUS FOR ISOLATED VIRTUAL ENVIRONMENTS

(71) Applicant: Parry Labs, LLC, Alexandria, VA (US)

(72) Inventors: Marc Couture, Alexandria, VA (US);
Michael Palmer, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/422,068

(22) Filed: Jan. 25, 2024

(65) Prior Publication Data

US 2025/0245032 A1    Jul. 31, 2025

(51) Int. Cl.
*G06F 9/455*        (2018.01)

(52) U.S. Cl.
CPC ..................... *G06F 9/45558* (2013.01); *G06F 2009/45562* (2013.01)

(58) Field of Classification Search
None
See application file for complete search history.

(56) References Cited

U.S. PATENT DOCUMENTS

| 9,203,855 | B1 | 12/2015 | Mooring et al. |
| 9,438,844 | B2 | 9/2016 | Camer et al. |
| 10,699,003 | B2 | 6/2020 | Zamir et al. |
| 11,016,793 | B2 | 5/2021 | Tsirkin |
| 11,475,140 | B1 | 10/2022 | Buonora |
| 11,789,764 | B2 | 10/2023 | Vidyadhara et al. |

| 11,915,026 | B1 * | 2/2024 | Chandrashekar | ..... G06F 9/5077 |
| 2015/0205618 | A1 * | 7/2015 | Bailey | ................... H04L 41/042 709/222 |
| 2019/0213032 | A1 * | 7/2019 | Eyal | ........................ G06F 9/455 |
| 2020/0364088 | A1 * | 11/2020 | Ashwathnarayan | .. G06F 9/5016 |

(Continued)

FOREIGN PATENT DOCUMENTS

| CN | 203561933 U | 4/2014 |
| CN | 105721780 A | 6/2016 |

(Continued)

OTHER PUBLICATIONS

Hosseinabady et al; Heterogeneous FPGA+GPU Embedded Systems: Challenges and Opportunities; arXiv:1901.06331v2 [cs.DC] Jan. 25, 2019.

(Continued)

*Primary Examiner* — Bradley A Teets
*Assistant Examiner* — Melissa A Headly
(74) *Attorney, Agent, or Firm* — Caldwell LLC

(57)            ABSTRACT

A hardware apparatus for isolated virtual environments includes graphics processing unit comprising a first dedicated memory and a first plurality of processing cores, a central processing unit comprising a second dedicated memory and a second plurality of processing cores, a field programmable gate array comprising a third dedicated memory, a control and data bus assembly connecting the field programmable gate array, the central processing unit, and the graphics processing unit, and a hypervisor located on a non-volatile memory of the hardware apparatus, the hypervisor configured to create one or more virtual machines by isolating the graphics processing unit, the central processing unit and the field programmable gate array.

16 Claims, 6 Drawing Sheets

(56) References Cited

U.S. PATENT DOCUMENTS

| | | | |
|---|---|---|---|
| 2021/0311798 A1* | 10/2021 | Desai | G06F 21/72 |
| 2023/0026505 A1 | 1/2023 | Lee et al. | |
| 2023/0092214 A1 | 3/2023 | Wu et al. | |
| 2023/0195485 A1* | 6/2023 | Nagasundaram | G06F 9/505 |
| | | | 718/1 |
| 2023/0244514 A1* | 8/2023 | Shang | H04L 67/2895 |
| | | | 709/226 |
| 2023/0305870 A1* | 9/2023 | Carey | G06F 9/5038 |
| 2025/0077257 A1* | 3/2025 | Gazvoda | G06F 9/45558 |

FOREIGN PATENT DOCUMENTS

| | | |
|---|---|---|
| TW | I585612 B | 6/2017 |
| WO | 2014031459 A1 | 2/2014 |
| WO | 2016102055 A2 | 6/2016 |

OTHER PUBLICATIONS

Rodriguez et al; Parallel multiprocessing and scheduling on the heterogeneous Xeon+FPGA platform; The Journal of Supercomputing vol. 76, pages4645-4665 (2020).
C Zhang et al; High-Performance and Energy-Efficient FPGA-GPU-CPU Heterogeneous System Implementation; Proceedings from PDPTA'20, CSC'20, MSV'20, and GCC'20; p. No. 477-492.
Santiago Lozano et al; A Comprehensive Survey on the Use of Hypervisors in Safety-Critical Systems; accepted Mar. 29, 2023, date of publication Apr. 5, 2023, date of current version Apr. 14, 2023. Digital Object Identifier 10.1109/ACCESS.2023.3264825.
Shuang Zhang; Virtualization Airborne Trusted General Computing Technology; Appl. Sci. 2023, 13(3) Published: Jan. 19, 2023.

* cited by examiner

500

505 — Receiving a Computing Device

510 — Receiving, By the Computing Device, One or More Software Containers

515 — Creating, By the Computing Device, a Separate Virtual Environment

520 — Executing, By the Computing Device, the Software Module

600

HARDWARE APPARATUS FOR ISOLATED VIRTUAL ENVIRONMENTS

FIELD OF THE INVENTION

The present invention generally relates to the field of virtual machines. In particular, the present invention is directed to a hardware apparatus for isolated virtual environments.

BACKGROUND

While virtual environments and virtual machines may provide some degree of isolation from a host operating system various security and vulnerability issues may still exist. Current systems used for the generation of virtual environments may be prone to exploits such as attacks through insufficiently secure third-party applications.

SUMMARY OF THE DISCLOSURE

In an aspect, a hardware apparatus for isolated virtual environments includes graphics processing unit comprising a first dedicated memory and a first plurality of processing cores, a central processing unit comprising a second dedicated memory and a second plurality of processing cores, a field programmable gate array comprising a third dedicated memory, a control and data bus assembly connecting the field programmable gate array, the central processing unit, and the graphics processing unit, and a hypervisor located on a non-volatile memory of the hardware apparatus, the hypervisor configured to create one or more virtual machines by isolating the graphics processing unit, the central processing unit and the field programmable gate array.

In another aspect, a method for generation of isolated virtual environments includes receiving a computing device including at least a host processor and at least a host memory communicatively connected to the at least a primary processor and a dedicated memory communicatively connected to the plurality of embedded processors, creating, by the computing device, one or more virtual machines by isolating at least one of the plurality of embedded processors and at least one of the plurality of dedicated memory for each virtual machine, generating, by the computing device, a separate virtual environment within each virtual machine, and deploying, by the computing device, at least one software container within each of the one or more virtual machines.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for heterogenous processing. Apparatus may include a graphical processing unit, a central processing unit, a dedicated memory for the central processing unit, a field-programmable gate array (FPGA), which may have a dedicated memory, a control and data bus assembly, and one or more cross-connections and/or input-output ports. In embodiments, apparatus may be connected to computing systems and/or local networks thereof to add processing power, support for secure, safety-critical operation of third-party applications, connections to peripherals, and the like. Apparatus may serve as a module in a modular computing system suitable for deployment in aircraft, land vehicles, command centers, and/or communication nodes in the field.

Figure 1:
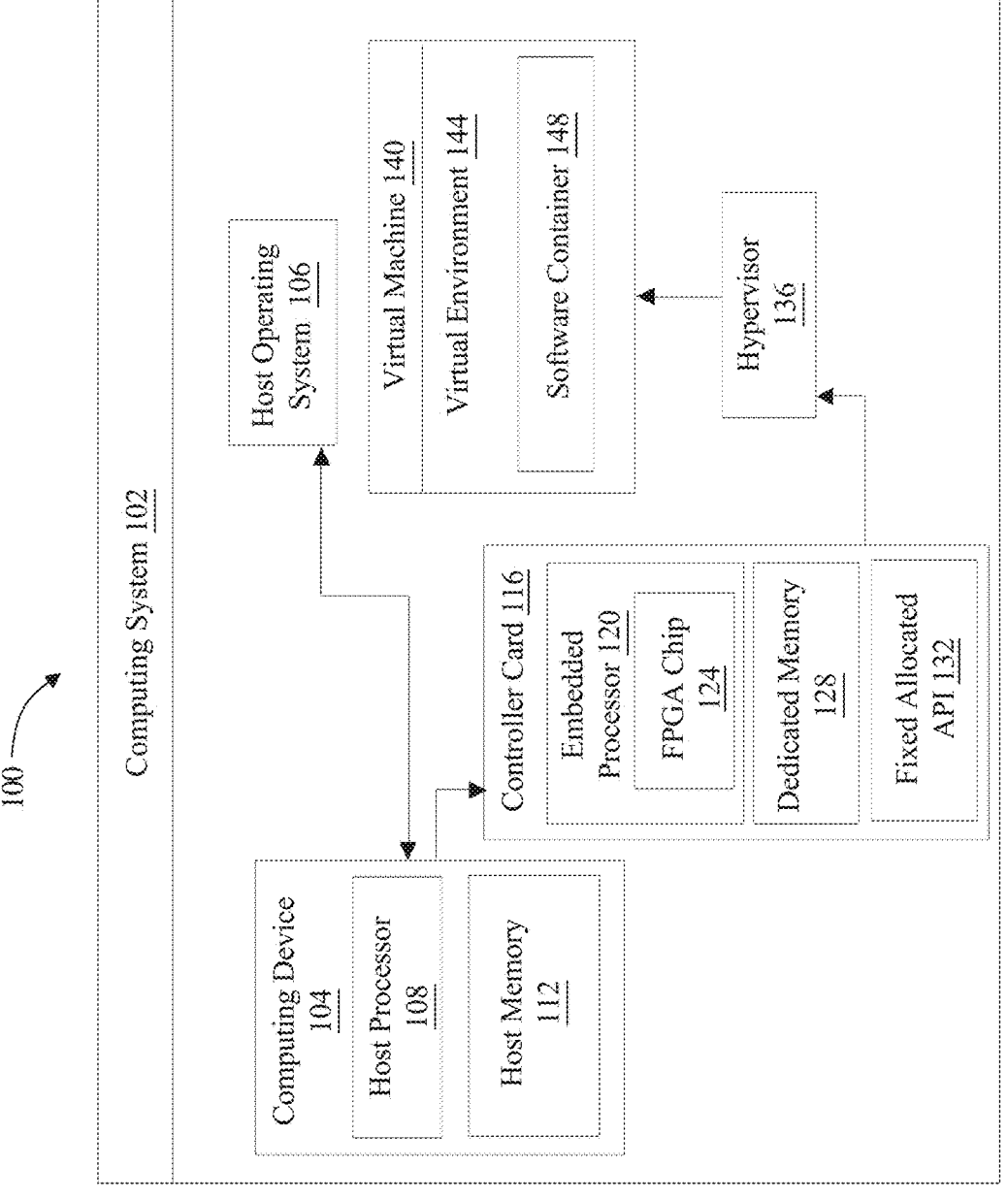
FIG. 1 is an exemplary embodiment of a hardware apparatus for isolated virtual environments.

Referring now to FIG. 1, a system 100 for isolated virtual environments is described. System 100 includes a computing system 102. Computing system 102 may include a computing device 104. "Computing system" for the purposes of this disclosure refers to a computing device containing one or more additional hardware components. For example, and without limitation, computing system 102 may include computing device with an additional graphics card. In one or more embodiments, computing system 102 may include a computing device 104 that has been modified to allow for increased storage space, increased processing power, increased network capabilities and the like. In one or more embodiments, computing system 102 may include a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. In one or more embodiments, each processor core within multi-core processor may function independently. In one or more embodiments, each processor core within multi-core processor may perform functions in parallel with other processor cores. In one or more embodiments, multi-core processor may allow for a dedicated processor core for each program and/or software running on a computing device. In one or more embodiments, multiple cores may be used for a singular function and/or multiple functions. In one or more embodiments, multi-core processor may allow for a computing device to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks.

With continued reference to FIG. 1, system 100 includes memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, memory may include, without limitation, any machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Memory 112 may include various components (e.g., machine-readable media) including, but not limited to, a random-access memory component, a read only component, and any combinations thereof. In one example, a basic input/output system (BIOS), including basic routines that help to transfer information between elements within computer systems, such as during start-up, may be stored in memory 112. Memory 112 may also include (e.g., stored on one or more machine-readable media) instructions (e.g., software) embodying any one or more of the aspects and/or methodologies of the present disclosure. In another example, memory 112 may further include any number of program modules including, but not limited to, an operating system, one or more application programs, other program modules, program data, and any combinations thereof.

With continued reference to FIG. 1, memory 112 may include a primary memory and a secondary memory. "Primary memory," which may include "random access memory" (RAM), is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage", "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. Examples of a storage device may include, but are not limited to, a hard disk drive, a magnetic disk drive, an optical disc drive in combination with an optical medium, a solid-state memory device, and any combinations thereof. Storage device may be connected to a bus by an appropriate interface. Example interfaces include, but are not limited to, SCSI, advanced technology attachment (ATA), serial ATA, universal serial bus (USB), IEEE 1394 (FIREWIRE), and any combinations thereof. In one example, storage device (or one or more components thereof) may be removably interfaced with computer systems (e.g., via an external port connector (not shown)). Particularly, storage device and an associated machine-readable medium may provide nonvolatile and/or volatile storage of machine-readable instructions, data structures, program modules, and/or other data for computer systems.

In one or more embodiments, data is transferred from secondary to primary memory wherein processor 108 may access the information from primary memory.

With continued reference to FIG. 1, processor 108 may include a host processor. "Host processor" for the purposes of this disclosure is a general-purpose processor located on computing device that is configured to manage operating system of computing device. Host processor may be configured to carry out functions of the operating system of computing device whereas other processors communicatively connected toc computing system 102 may be given differing and/or distinct functions. In one or more embodiments, memory 112 may include a host memory. "Host memory" for the purposes of this disclosure is a memory containing instructions and/or information from the operating system on computing device. In one or more embodiments, host memory may be dedicated to host processor wherein instructions on host memory 112 may be carried out by host processor. In one or more embodiment host memory and/or host processor may be included within host circuit as described in further detail below. In one or more embodiments, host memory may contain instructions configuring host processor to manage other memory and/or processors on and/or connected to computing device 104.

With continued reference to FIG. 1, system 100 may include a host circuit. Host circuit may include at least a processor 108 and/or host processor communicatively connected to a memory 112 and/or host memory. As used in this disclosure, a "host circuit" is an integrated circuit or a collection of interconnected circuits designed to manage, control, and/or interface with one or more functionalities in a system 100. In a non-limiting example, host circuit may be configured as a primary platform or base that provides essential infrastructure, resources, and interfaces to facilitate the operation of other connected or integrated components. Hosting circuit may include any computing device 104 as described in this disclosure, including without limitation a microcontroller, microprocessor 108, digital signal processor 108 (DSP) and/or system 100 on a chip (SoC) that provide one or more services, resources, or data to other computing devices. Host circuit may include, be included in, and/or communicate with a mobile device such as a mobile telephone or smartphone. Host circuit may include a single computing device 104 operating independently or may include two or more computing device 104 operating in concert, in parallel, sequentially or the like; two or more computing devices may be included together in a single computing device 104 or in two or more computing devices. In some cases, host circuit may include but is not limited to, for example, a computing device 104 or cluster of computing devices in a first location and a second computing device 104 or cluster of computing devices in a second location. In other cases, host circuit may include a main unit or a primary circuit in a network that controls communications and/or provide a central point of interface.

With continued reference to FIG. 1, computing device 104 may include a host operating system 106. In one or more embodiments, host circuit may provide the hardware to allow for host operating system 106. Host operating system may include any host operating system 106 as described in this disclosure. In one or more embodiments, one or more software and/or applications as described in this disclosure may be initialized by host operating system 106. In one or more embodiments, host operating system 106 may include the primary operating system of computing system 102. In one or more embodiments, one or more operating systems may be run on computing system 102 through one or more virtualization processes wherein host operating system 106 may include the primary operating system. In one or more embodiments, host operating system 106 may be configured to manage the one or more virtualization processes as described in further detail below. In one or more embodiments, virtual machines, virtual environments and the like may be accessed by host operating system 106 as described in further detail below.

With continued reference to FIG. 1, computing system 102 may include a controller card 116. "Controller card" for the purposes of this disclosure is a separate hardware component that may be connected to computing device 104 in order to provide additional or improved computing capabilities. For example, and without limitation, controller card 116 may allow for increased network bandwidth, increased processing power, increased memory, increased storage space, network connectivity, additional input ports and the like. In another non limiting example, controller card 116 may include a graphics card wherein the graphics card is configured to process images for computing device. In one or more embodiments, the graphics card may include a graphical processing unit (GPU) wherein the GPU includes a processor configured to calculate and process visual information on computing device. In one or more embodiments, controller card 116 may include, but is not limited to, a hard drive controller card 116, an internal seria ATA (SATA) card, and external SATA (eSATA), a graphics card, an audio card, a network interface card, a Bluetooth card, a modem card, a CPU card and the like. In one or more embodiments, controller card 116 may provide for additional or improved computing capabilities. In one or more embodiments, controller card 116 may be connected to computing device through one or more peripheral component interconnect express (PCIe) slots on computing device. In one or more embodiments, computing device may contain one or more PCIe slots wherein each slot may be configured to receive and communicate with a separate controller card 116. PCIe slots may allow for a high-speed interface between computing device and one or more controller cards 116. In one or more embodiments, PCIe may allow for increased data transfer rates between computing device and controller card 116. In one or more embodiments, PCIe slot may include various PCIe generation such as PCIe 3.0, PCIe 4.0, PCIe 5.0 and/or PCIe 6.0 wherein a PCIe with a higher generation may contain a larger bandwidth per lane. For example and without limitation, PCIe 3.0 may contain a data transfer rate of 8 gbps (gigabytes per second) per lane whereas PCIe 5.0 may provide for a data transfer rate of 32 Gbps per lane. In one or more embodiments differing PCIe slots may contain one or more lanes wherein each lane may provide for a particular data transfer rate between PCIe slot and computing device. For example, and without limitation, a PCIe with 16 lanes may provide double the data transfer rate as a PCIe with 8 lanes. In one or more embodiments, the number of lanes a particular PCIe slot may contain may be denoted as 'x1' wherein the numerical digit following the 'x' may indicate the number of lanes. For example, a PCIe X16 may contain 16 lanes. In one or more embodiments, the number of lanes for a particular PCIe may depend on the function of the controller card 116. For example, and without limitation, a network controller card 116 may not require a large data transfer rate and therefore may utilize a PCIe slot with less lanes. In one or more embodiments, differing PCIe slots may provide differing power outputs wherein a PCIe x1 slot may receive less power than a PCIe x16 slot. In one or more embodiments, controller card 116 may be communicatively connected and/or physically connected to computing device through PCIe slot. In one or more embodiments, controller card 116 may be fixedly and/or removably attached to a motherboard of computing device.

With continued reference to FIG. 1, in one or more embodiments, controller card 116 may include one or more processors as described in this disclosure. In one or more embodiments, controller card 116 and/or the processors on controller card 116 may include one or more embedded processors 120. "Embedded processor" for the purpose of this disclosure is a processing component that has been designated for a specific task in a larger computing environment. For example, and without limitation, embedded processor 120 may include a processor configured to transform analog signals into digital signals, a processor for automotive systems, control systems and the like. In one or more embodiments, embedded processor 120 may be separate and distinct from processor 108. In one or more embodiments, processor 108 may be referred to as a host processor and the embedded processes as the child processor wherein the host processor is configured to perform various computing functions for the computing device, while the child processor is given a particular function. In one or more embodiments, embedded processor 120 may contain any type of processing device such as but not limited to a central processing unit (CPU), a graphical processing unit (GPU), a field programmable gate array (FPGA) chip 124, a micro controller, a reduced instruction set computer (RISC) processor, a complex instruction set computer (CISC), an ARM processor, an AI accelerator and the like. In one or more embodiments, controller card 116 may contain one or more embedded processors 120 and/or a plurality of embedded processors 120. In one or more embodiments, the one or more embedded processors 120 may differ from one another. For example, and without limitation, a first embedded processor 120 may include a CPU whereas a second Embedded processor may include a GPU. In one or more embodiments embedded processors 120 on controller card 116 may include a plurality of heterogenous processing components. "Heterogenous processing components" for the purposes of this disclosure are processors having differing structures and/or cores from one another. For example, and without limitation, heterogenous processing components may include a GPU and CPU. In one or more embodiments, heterogenous processing components may include differing processor cores wherein a first CPU may contain 6 processor cores whereas a second CPU may contain 8 processor cores. In one or more embodiments, heterogenous processing components may be configured to differing tasks, functions and the like. In one or more embodiments a structure having heterogenous processing components may allow for increased computational efficiency wherein each embedded processor 120 may excel at differing processes. For example, and without limitation, a CPU may be efficient at running operating systems and inefficient at processing images whereas a GPU may be more efficient at processing images. In one or more embodiments, a collection of heterogenous processing components may allow for increased diversity between processing components wherein processors may be selected based on their capability to perform a particular task or function. In one or more embodiments, a system of heterogenous processing components may allow for increased isolation wherein a first embedded processor 120 may contain increased isolation between a second embedded processor 120.

With continued reference to FIG. 1, controller card 116 may contain a dedicated memory. "Dedicated memory" for the purposes of this disclosure is a memory that is configured exclusively for a particular processor or embedded processor 120. For example, and without limitation, dedicated memory may include a physical hardware device that is used exclusively for a particular processor. Continuing the example, a GPU may contain a dedicated memory wherein the dedicated memory may contain a video random access memory (VRAM). In one or more embodiments, VRAM may be dedicated to GPU wherein data generated and/or carried out by GPU may be stored in VRAM. In one or more embodiments, each embedded processor 120 may contain dedicated memory wherein dedicated memory may be configured to carry out tasks exclusively for each embedded processor 120. In one or more embodiments, controller card 116 may contain a plurality of dedicated memory cards wherein each memory card may differ from one another. For example, and without limitation dedicated memory may include VRAM wherein VRAM may include a memory that has been dedicated for graphics processing. In one or more embodiments, VRAM may contain graphics memory chips that allow for high-speed data transfer and parallel processing. In one or more embodiments, VRAM may be optimized for graphical processing wherein VRAM may obtain increased read and write writes in comparison to conventional memory. In one or more embodiments, VRAM may be configured for particular functions such as image and video processing. In one or more embodiments, dedicated memory may further include random access memory (RAM) or system RAM. In one or more embodiments, System RAM may be configured to allow for a wide range of functions. In contrast to VRAM, system ram may be configured to process graphical images as well as other functions. In one or more embodiments, system RAM may sacrifice performance for reliability and multitasking capabilities. For example and without limitation, while a system RAM may process images at a slower rate, the system RAM may be configured for a wide variety of applications. In one or more embodiments, dedicated memory may include a Block RAM, wherein the block RAM is a memory configured for FPGA chips 124. In one or more embodiments, dedicated memory may include Block RAM, ultra-RAM, configuration memory, distributed RAM, and the like. In one or more plurality of dedicated memory may include plurality of heterogenous memory components wherein each dedicated memory may differ from one another. For example, and without limitation, a first dedicated memory may include VRAM, whereas a second dedicated memory may include block RAM. In one or more embodiments, heterogeneous memory components may allow for increased isolation between two or more processing components. In one or more embodiments, differing dedicated memory components may allow for memory components that are configured exclusively to allow for a processor to run more efficiently. In one or more embodiments, differing dedicated memory components may allow for prevention of direct memory access (DMA) wherein a particular software running on a first memory may not interfere with a particular software running on a second memory. In one or more embodiments, dedicated memory may include differing bandwidths such as DDR1, DDR2, DDR3, DDR4 and/or DDR5. In one or more embodiments, in instances in which two dedicated memory may be similar, controller card 116 may contain differing bandwidths wherein a first dedicated memory may include DDR4, and a second dedicated memory may contain DDR4. In one or more embodiments, a memory having a lower bandwidth may not communicate with a memory having a higher bandwidth. In one or more embodiments, each dedicated memory may contain differing storage space. In one or more embodiments, each embedded processor 120 may contain its own dedicated memory wherein the dedicated memory is not partitioned and shared between more than one processors. In one or more embodiments, it may be desirable to partition one dedicated memory while leaving other dedicated memory alone. For example, and without limitation, a software that is safety critical may run on a singular embedded processor 120 and corresponding dedicated memory wherein other software that are not as critical with respect to safety may allocate processor cores of a single embedded processor 120 and allocate partitions of the dedicated memory to various virtual environments. In one or more embodiments, dedicated memory may include primary memory and/or secondary memory. In one or more embodiments, several physical secondary components may exist on controller card 116 wherein each embedded processor 120 and dedicated primary memory may be communicatively connected to the physical secondary memory. In one or more embodiments, a single physical secondary memory component may exist wherein the single secondary memory may be partitioned. In one or more embodiments, each partition may be allocated to an embedded processor 120 and dedicated memory 128 pair.

With continued reference to FIG. 1, controller card 116 may include a boot operating storage solution (BOSS) card. "Boot operating storage solution card" for the purposes of this disclosure is a specialized controller card 116 configured to improve the boot times on a computing device. In one or more embodiments, BOSS card may contain a primary memory and secondary memory that operates faster than the host memory. In one or more embodiments, BOSS card may include flash memory herein the flash memory may allow for quicker boot times. In one or more embodiments, BOOS CARD may store the operating system of computing device wherein the operating system may be stored and run a separate memory. In one or more embodiments, BOSS cards may contain dedicated boot partition wherein the operating system may be stored on a separate partition of the storage device to allow for faster access and quicker boot times. In one or more embodiments, Boss card may include one or more embedded processors 120 dedicated to booting up an operating system on computing device. In one or more embodiments, computing system 102 may contain a plurality of BOSS cards, wherein each BOSS card may be connected to a differing PCIe slot. In one or more embodiments, each BOSS card may be configured for a differing operating system and/or differing virtual environment as described in further detail below.

In one or more embodiments, controller card 116 may include a Virtual cross path (VPX) controller card 116. "VPX controller card" for the purposes of this disclosure is a controller card 116 that has met the standards and/or limitations of the VMEbus International Trade Association (VITA). VPX standards may include standards such as but not limited to, specific size requirements, various high spend requirements. In one or more embodiments, VPX components may adhere to one of two form factors: a 3 U form factor wherein the component must have a maximum width of 100 millimeters (mm) and a 6 U form factor wherein the component must contain a maximum width of 160 mm. In one or more embodiments VPX controller card 116 may include a controller card 116 having a maximum width of 100 millimeters. In one or more embodiments, VPX controller card 116 may include a maximum width of 160 millimeters. In one or more embodiments, VPX controller card 116 may include a 3 U VPX controller card 116 wherein the controller card 116 contains a maximum width of 100 mm and a maximum length of 160 mm. In one or more embodiments, VPX controller card 116 may contain a MultiGig RT2 connector or a MultiGig RT3 connector. In one or more embodiments, VPX components may follow an OpenVPX standard (VITA 66 and/or VITA 67) as established by the VMEbus International Trade Association. In one or more embodiments, VPX components such as, but not limited to VPX controller card 116 may contain temperature range requirements wherein the component must be able to operate between temperature of −40 degrees Celsius to 80 degrees Celsius. In one or more embodiments, VPX component may support high speed fabric interconnects in the range of 10 gbps to 100 gbps. In one or more embodiments, VPX component may contain secure boot software, tamper detection software and/or encrypted software. In one or more embodiments, VPX controller card 116 may be encrypted. In one or more embodiments, VPX controller card 116 may contain a secure boot software. In one or more embodiments, VPX controller card 116 may contain components that have been VPX certified and/or components that adhere to VPX standards. For example, and without limitation, embedded processors 120 may include a VPX embedded processor 120 wherein the embedded processor 120 may adhere to VPX standards. In an embodiment, VPX controller card 172 may, as a non-limiting example, enable and/or govern connection of elements of bus 136 to one another and/or to exterior and/or peripheral devices, such as without limitation devices connected via input/output ports to field-deployable hardware module.

With continued reference to FIG. 1, in one or more embodiments, controller card 116 may contain driver software. "Driver software" for the purposes of this disclosure is software that allows a component to communicate with a computing device. For example, and without limitation, controller card 116 may contain driver software that allows computing device to communicate with controller card 116. In one or more embodiments, driver software may include software that allows an individual to access various capabilities of the controller card 116. For example, and without limitation, driver software may allow an individual to access the boot menu of a components, access various information about the hardware and the like. In one or more embodiments, controller card 116, computing system 102 and/or computing device may contain driver software that allows for allocation of one or more components on controller card 116 to be isolated.

With continued reference to FIG. 1, in one or more embodiments, controller card 116 may be encrypted, password protected and the like. In one or more embodiments, controller card 116 may contain one or more authentication mechanisms wherein a password, particular user and the like may be required to allow access to controller card 116. In one or more embodiments, controller card 116 may be encrypted in any way as described in this disclosure. In one or more embodiments, data stored on controller card 116 may be encrypted. In one or more embodiments, data stored in a memory of controller card 116 may be encrypted. In one or more embodiments, data transferred from controller card 116 to computing device, such as to host operating system 106 may be encrypted wherein a decryption key may be needed to decrypt the information. In one or more embodiments, authorized users who have access to decryption key may be able to decrypt information within controller card 116. In one or more embodiments. In one or more embodiments, controller card 116 may be configured to initiate a secure boot process when system 100 and/or computing system 102, in some cases, is powered on or restarted. In some cases, controller card 116 may include a trusted platform module (TPM), wherein the "trusted platform module," for the purpose of this disclosure, is a specialized chip on an endpoint hardware component (i.e., device) that store keys e.g., cryptographic keys such as encryption keys, decryption keys, public keys, private keys, or any key as described herein. In a non-limiting example, controller card 116 may include a plurality of TPMs, each containing an RSA key pair known as "Endorsement key (EK)," wherein the RSA key pair may be maintained inside of a TPM and cannot be accessed by outside individuals. In some cases, controller card 116 may include a bootloader (i.e., the first piece of software that runs). In some cases, bootloader may be verified, for example, one or more system firmware may be configured to check bootloader's digital signature before execution using keys e.g., public keys stored in TPM or another secure component. In case where bootloader's signature doesn't match, controller card 116 may halt, preventing potential malicious partitions from running. Once bootloader is verified and executed, one or more software, such as a hypervisor 136 as described in further detail below, may be instantiated. In some cases, software on controller card 116, such as hypervisor 136 and/or fixed allocated ASPI may also be verified through an associated digital signature to ensure its authenticity. In a non-limiting example, Controller card may boot only with trusted and authenticated partitions e.g., a primary partition and plurality of child partitions. Child partitions be verified before loading, or trusted version of second partition may be loaded. Hypervisor may be configured to prevent any child partition that yield a negative response during verification. In some cases, all events during the secure boot process as described herein, including, without limitation, any verification failures or anomalies, can be communicated to primary partition through virtual bus. In some cases, these events may be alerted to certain users e.g., administrators. Additionally, or alternatively, in cases where verification fails, controller card 116 may be configured to boot into a safe mode, attempting to restore a trusted software version, or simply halting the processor to prevent potential threats.

With continued reference to FIG. 1, controller card 116 may include a field replaceable unit (FRU). "Field replaceable unit" for the purposes of this disclosure is a hardware component that is removably attached to a computing device. In one or more embodiments, FRU may include push buttons, levers, switches the like to facilitate removal of FRU from computing device. In one or more embodiments, FRU may include a component that is accessible without undue burden, such as through the removal of screws, unsoldering and the like. In one or more embodiments, FRU may communicate with computing device through PCIe slot wherein PCIe slot may allow for removal and insertion of an FRU such as controller card 116. In one or more embodiments, controller card 116 may be portable wherein controller card 116 may be removed from a first device and placed within a second device.

Still referring to FIG. 1, in some embodiments, controller may include FPGA Mezzanine Card (FMC). In some embodiments, FMC may be used to transfer data in and/or out of embedded processor 120, such as an FPGA chip 124. In some embodiments, FMC may connect to an external computing device. In a non-limiting example, computing system 102 may receive instructions and/or other data through FMC. In another non-limiting example, system 100 may output data through FMC. FMC may conform to FMC standards.

With continued reference to FIG. 1, in one or more embodiments, system 100 may include a fixed allocated application program interface (API). "Fixed allocated API" for the purposes of this disclosure is a programming interface that allows a computing system 102 to isolate different computing components. For example, and without limitation, Fixed allocated API may include software configured to dedicate each embedded processor 120 and memory pair to a particular software, virtual environment 144 and/or virtual machine 140. In one or more embodiments, fixed allocated API 132 may act as an intermediary between a software and a hardware. For example, and without limitation, instead of communicating directly with a hardware, a software may first communicate with fixed allocated API 132, wherein fixed allocated API 132 may be allocated resources accordingly. In one or more embodiments, fixed allocated API 132 may generate an abstraction layer between hardware and a software of computing system 102. "Abstraction layer" for the purposes of this disclosure is a software that serves as an intermediary between a higher-level software, such as an operating system and a hardware. In one or more embodiments, fixed allocated API 132 may generate an abstraction layer wherein higher-level software may communicate with fixed allocated API 132 and receive allocated resources. In one or more embodiments, the abstraction layer may provide a set of instructions for how each software component may communicate with a software component. In one or more embodiments, fixed allocated API 132 may allocate hardware resources for particular software through abstraction layer. For example, and without limitation, an embedded processor 120 and dedicated memory pair may be allocated to a particular software, virtual machine 140 and the like wherein other software may not have access to the embedded processor 120 and dedicated memory pair (known henceforth as 'hardware pair'). In one or more embodiments, abstraction layer may allow for allocation of hardware resources wherein each virtual environment 144 and/or software may be allocated an isolated processing component and memory. In one or more embodiments, fixed allocated API 132 may allow for isolation of each embedded processor 120 and dedicated memory on controller card 116. In one or more embodiments, fixed allocated API 132 may isolate an embedded processor 120 and associated dedicate memory from another embedded processor 120 and associated dedicated memory.

With continued reference to FIG. 1, in one or more embodiments, fixed allocated API 132 may further be configured to allocate a particular hardware based on the requirements of the software. For example, and without limitation, a virtual machine 140 requiring larger processing power may be allocated a hardware pair that is configured for larger processing power. In one or more embodiments, fixed allocated API 132 may be accessed directly through the hardware of controller card 116 and/or accessed by host operating system 106. In one or more embodiments, fixed allocated API 132 may contain a machine learning model configured to allocate hardware pairs to various virtual machines 140. For example, and without limitation a plurality of virtual machines 140 may exist wherein fixed allocated API 132 may be configured to allocate a hardware pair to each virtual machine 140. In one or more embodiments, fixed allocated API 132 may utilize a machine learning model to assign each virtual machine 140 to a hardware. In one or more embodiments, each virtual machine 140 may contain resource requirements wherein fixed allocated API 132 may determine the correct hardware pair based on the resource requirements. In one or more embodiments, virtual machines 140 may be allocated to hardware pairs based on projected or anticipated performance metrics, wherein a particular resource requirements and hardware paid may project a particular performance metric. In one or more embodiments, following execution of one or more virtual machines 140 one controller card 116, fixed allocated API 132 and/or host operating system 106 may receive performance metrics for each virtual machine 140 to determine the performance of each virtual machine 140 operating on a particular hardware. In one or more embodiments, fixed allocated API 132 may contain an allocation machine learning model. In one or more embodiments, an allocation machine learning model may be trained with allocated training data. In one or more embodiments, allocated training data may contain a plurality of resource requirements and hardware pairs correlated to a plurality of performance metrics. In an embodiments a particular software having a particular resource requirement may contain a correlated performance metric based on the hardware pair it was assigned to. For example, and without limitation, a virtual machine 140 assigned to a GPU and VRAM may be associated with one set performance metrics whereas a virtual machine 140 assigned to a CPU and RAM may be associated with another set of performance metrics. In one or more embodiments allocated training data may be used to train allocation machine learning model, wherein allocation machine learning model may receive resource requirements and a hardware pair as an input and output performance metrics as an output. In one or more embodiments, fixed allocated API 132 may compare various resource requirement and hardware paid configurations to receive correlated outputs of performance metrics wherein fixed allocated API 132 may select the configuration that allows for increased performance. In one or more embodiments, allocation machine learning model may include and/or be included in any machine learning model as described in this disclosure. In one or more embodiments, allocation machine learning model may operate on host operating system 106 and/or a cloud server to compute outputs wherein the outputs may be transmitted to fixed allocated API 132. In one or more embodiments, outputs may be stored on host memory for future iterations wherein a similar software and hardware pair configuration may be used.

In one or more embodiments, fixed allocated API 132 may create abstraction layer to allow for allocation of a hardware pair to a particular software. In one or more embodiments, allocation may allow for increased isolation between two software wherein a first software may operate on a first hardware pair and a second software may operate on a second separate hardware pair. In one or more embodiments, isolation of software may allow for prevention of direct memory access. In one or more embodiments, isolation of one or more software may allow for increased reliability wherein a failure of a first hardware pair may not affect a second hardware pair.

With continued reference to FIG. 1, in one or more embodiments, fixed allocated API 132 may be contrasted to a flexible API. A "Flexible API" for the purposes of this disclosure is an interface that allows for heterogenous computing. "Heterogenous computing" for the purposes of this disclosure is a system that utilizes multiple differing processors simultaneously by allocating tasks to each processor. For example, and without limitation, Flexible API may allow for the leveraging of various processes on controller card 116 wherein Flexible API may assign workloads to differing processors based on their availability and capabilities. In one or more embodiments, Flexible API may allow for a software to communicate with an abstraction layer wherein workloads are assigned to differing processors based on their specific purpose. In one or more embodiments, Flexible API may allow for increased performance and efficiency wherein multiple hardware pairs are used to carry out one or more functions. In one or more embodiments, controller card 116 may contain both Flexible API and Fixed allocated API wherein some hardware pairs may be grouped together to create a more efficient system whereas other hardware pairs are isolated to allow for increased security.

With continued reference to FIG. 1, in or more embodiments, system 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, system 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, system 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, computing system 102 may be configured to create one or more virtual machines 140 by isolating at least one of the plurality of embedded processors 120 and at least one of the plurality of dedicated memory for each virtual machine 140. In one or more embodiments, computing system 102 may contain more than one embedded processors 120 and associated dedicated memory wherein each virtual machine 140 may receive an isolated hardware pair. In one or more embodiments, each virtual machine 140 may contain its own isolated hardware pair wherein, for example, a first virtual machine 140 may be allocated a GPU and VRAM and a second virtual machine 140 may be allocated a CPU and RAM. In one or more embodiments, computing system 102 may allocate embedded processor 120 and dedicated memory to virtual machine 140 using Fixed allocated API as described above. In one or more embodiments, computing system 102 may allocate embedded processor 120 and dedicated memory to virtual machine 140 using a bare-metal and/or type-1 hypervisor 136. Hypervisor is described in further detail below. In one or more embodiments, hypervisor 136 may allow for allocation and/or isolation of embedded processor 120 and dedicated memory. In one or more embodiments, hypervisor 136 may allow for device passthrough. "Device passthrough" for the purposes of this disclosure is a system in which a hypervisor 136 may allow for direct and exclusive access of one or more hardware components to a virtual machine 140. For example, and without limitation, hypervisor 136 may allow for a virtual machine 140 to have direct access to embedded processor 120 and dedicated memory. In one or more embodiments, each virtual machine 140 may have direct access to a separate embedded processor 120 and a separate dedicated memory. In one or more embodiments, device passthrough may allow for a pass through of the host operating system 106 wherein virtual machine 140 may directly access the hardware pair. In one or more embodiments, device pass through may include GPU passthrough wherein a GPU may pass through and be directly connected to virtual machine 140. In one or more embodiments, device passthrough may include FPGA pass through wherein a virtual machine 140 may have direct access to FPGA chip. In one or more embodiments, Hypervisor may create one or more machines as described in further detail below. In one or more embodiments, hypervisor 136 may isolate each embedded processor 120 and dedicated memory and allocate embedded processor 120 and dedicated memory to virtual machine 140. In one or more embodiments, virtual machines 140 may be created in any way as described in this disclosure.

With continued reference to FIG. 1, computing system 102 is configured to generate a virtual environment 144. Virtual environment may include any virtual environment 144 as described in this disclosure. In one or more embodiments, computing system 102 may be configured to generate a virtual environment 144 for each virtual machine 140 of one or more virtual machines 140. In one or more embodiment, each virtual environment 144 may include a differing operating system wherein a first virtual environment 144 may contain a differing operating system as a second virtual environments 144. In one or more embodiments, computing system 102 may be configured to generate a separate virtual environments 144 within each virtual machine 140. In one or more embodiments, computing system 102 may be configured to deploy software container 148 (as described in further detail below). In one or more embodiments, software container 148 may be transferred to virtual environment 144 using host operating system 106. In one or more embodiments, host operating system 106 may contain virtual remote, an SSH shell and the like wherein software container 148 may be transmitted to virtual environment 144. In one or more embodiments, host operating system 106 may be configured to create virtual environments 144, virtual machine 140, virtual script and/or virtual package wherein host operating system 106 may transfer virtual environments 144, virtual machine 140, virtual script and/or virtual package to one or more partitions. In one or more embodiments, computing system 102 may contain one or more storage devices wherein each storage device may contain virtual machine 140, virtual environment 144 and the like. In one or more embodiments, computing system 102 may be configured to allocate storage space and/or memory through the creation of partitions as described in further detail below.

With continued reference to FIG. 1, computing system 102 may include computing device and/or system as described in this disclosure. In one or more embodiments, computing system 102 may perform one or more functions of computing device as described in this disclosure. In one or more embodiments, computing system 102 may be configured to perform any step and/or processes as described in this disclosure. In one or more embodiments, computing system 102 may be configured to isolate virtual environments 144, virtual machines 140, software containers 148 and the like as described in this disclosure. In one or more embodiments, each virtual machine 140 as described in this disclosure may operate on a separate embedded processor 120 and dedicated memory. In one or more embodiments, hypervisor 136 such as a type 1 hypervisor 136 may facilitate the creation of one or more virtual machines 140, one or more virtual environments 144 and the like. In one or more embodiments, host operating system 106 may be operated on computing device, wherein one or more functions, scripts, packages and the like may be deployed from host operating system 106 and onto controller card 116. In one or more embodiments, computing device may contain host operating system 106 such as host operating system 106 as described in this disclosure. In one or more embodiments, hypervisor 136 may be instantiated and managed on host operating system 106. In one or more embodiments, a virtual remote may be used to access controller card 116 and/or one or more operating systems operating on controller card 116 through host operating system 106. In one or more embodiments, host operating system 106 may be stored on a storage device separate from a storage used for controller card 116.

Figure 2:
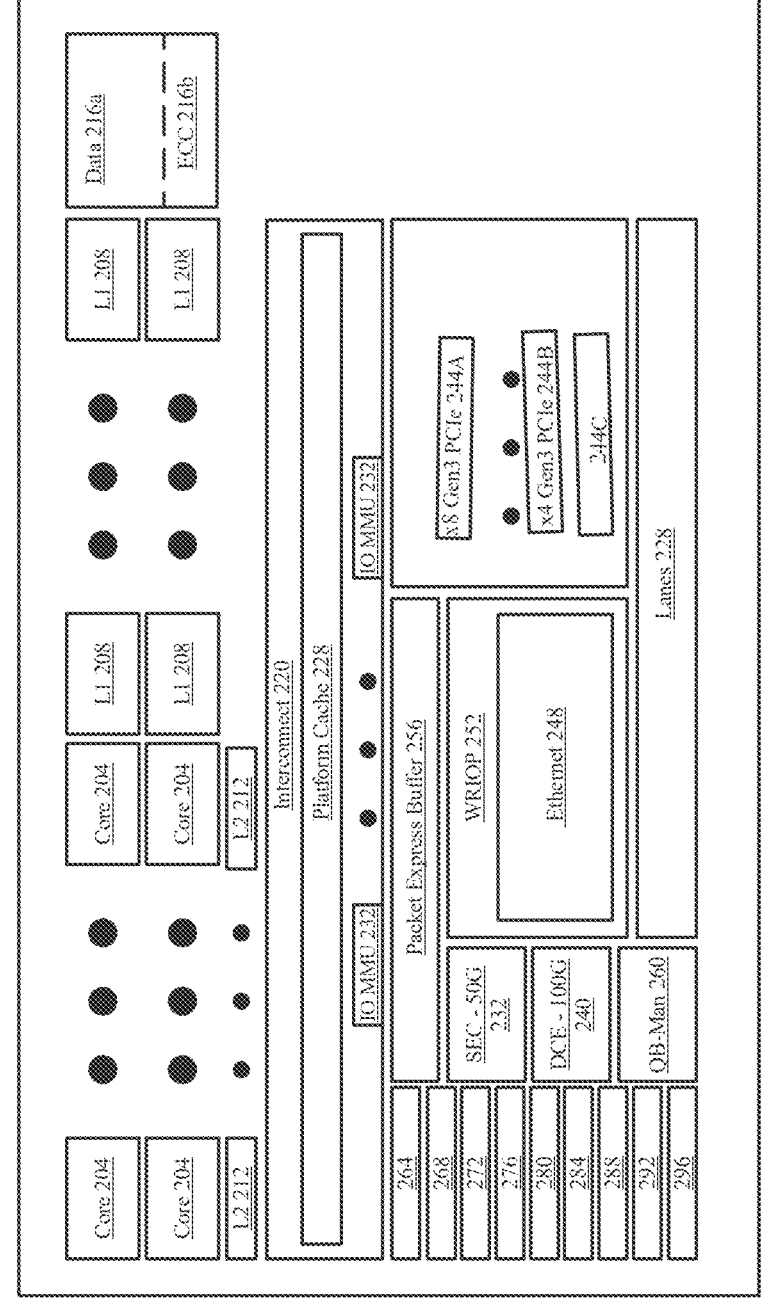
FIG. 2 is an exemplary embodiment of a general purpose processor.

Now referring to FIG. 2, in some embodiments, CPU 200 may include a standalone processor, or may be integrated into a processor with one or more GPU cores, such as without limitation as implemented in a system like a JET-SEN as implemented by Nvidia Corporation of Santa Clara, CA. CPU 200 may include 8, 12, or 16 or more CPU cores 204. CPU cores 204 may run at any suitable clock speed, such as 0.5 to 3 GHz. CPU 200 may include 18 MB cache/on-chip memory. CPU 200 may include one or more L1 caches 208, which may each be connected to and/or integrated into a core 204 and/or may be shared by two or more cores; L1 caches may be structured in any suitable manner, and may include, without limitation, 8 MB of memory, 4 MB of memory, or any suitable amount. CPU 200 may include one or more L2 caches 212; L2 caches 212 may be connected to L1 caches and/or structured therewith in any suitable manner, and may each have any suitable amount of memory, including without limitation 8 MB, 6 MB, or the like. CPU 200 may include one or more primary and/random-access memory (RAM) elements 216*a-b*, each of which may include a plurality of data storage elements 216*a*, defined as elements dedicated to storing bits of data in any suitable format, such as in bytes, 32-bit words, 63-bit words, or the like. Primary memory may alternatively or additionally include one or more elements of ECC memory 216*b*, defined as memory dedicated for use in error correction codes (ECC) for detection and/or correction of error; such memory may include, without limitation, 8 or more bits per 64-bit word, 4 or more bits per 32-bit word, 1 or more bits per byte, or the like. Primary memory 216*a-b* may be implemented in any suitable manner such as using DDR4 or the like and may have 100 or more GB of capacity. In some embodiments, CPU 200 may be configured such that information is retrieved from memory based on speed of information recovery from the memory. For example, CPU 200 may be configured such that an L1 cache is checked for relevant information first, then an L2 cache may be checked for relevant information, then operating memory such as DDR4 memory may be checked for relevant information. CPU 200 may include interconnect 220, a platform cache 224, which may have any suitable capacity such as without limitation 8 MB or more, and/or IO MMU 228. CPU 200 may include a plurality of Serializer/Deserializer (SerDes) lanes such as without limitation 24 or more such lanes, which may operate at any suitable clock speed such as without limitation 25 GHz. Such lanes may include one or more PCIe and/or PCIe Gen3 lanes 232 per SerDes lane, which may each, as a non-limiting example, support x8 ports. CPU 200 may include a security accelerator 236, which may operate at a data rate of 50 Gbps or more. CPU 200 may include a data compression/decompression engine 240, which may operate, in a non-limiting example, at 100 Gbps or more. CPU 200 may comply with any suitable security and/or trusted computing standard, such as without limitation an ARM SystemReady ES standard. CPU 200 may include one or more PCIE and/or Gen3 PCIe 244A-B. CPU 200 may include one or more SATA PCIe cards 244C. CPU 200 may include a 10 MB plat cache+PEB. CPU 200 may include WRIOP 25 of 16 simultaneous MACs; combos of up to 16× 1GE, 10× 1/2.5/10GE, 6× 25GE, and/or 2×40/50/100GE; and/or L2 switching up to 114 Gbps. CPU 200 may include 8, 12, or 16 any suitable number of Ethernet ports 252. CPU 200 may support any suitable Ethernet speeds including without limitation 1, 2.5, 10, 25, 40, 50, and 100 gigabits per second. CPU 200 may include a 114 Gbps Layer 2 Ethernet switch. CPU 200 may include a packet express buffer 256, which may have any size such as without limitation 2 or more MB. CPU 200 may include QB-Man 260. CPU 200 may include secure boot system 264. CPU 200 may include secure resource component 268. Secure resource component 268 may include one or more resources which are hardware separated. Secure resource component 268 may prevent non-secure software from accessing secure resources. Secure resource component 268 may include ARM TrustZone. CPU 200 may include power management system 272. CPU 200 may include SD/eMMC 276. CPU 200 may include 2× DUART 280. CPU 200 may include 8× I2C 284. CPU 200 may include SPI, GPIO, JTAG 288. CPU 200 may include 2× USB3.0+PHY 290. CPU 200 may include 2× CAN-FD 296.

Still referring to FIG. 2, in some embodiments, DDR4 may include persistent memory. 72 bit DDR4 may store 72 bit words. Similarly, CPU cores 204 may include 72 bit word memory. 72 bit words may include 64 bit words and error correction code (ECC) memory. ECC memory may be used to verify data stored in memory and/or identify errors in data stored in memory. Use of ECCs may include encoding of a message or lot of data using redundant information, permitting recovery of corrupted data. An ECC may include a block code, in which information is encoded on fixed-size packets and/or blocks of data elements such as symbols of predetermined size, bits, or the like. An ECC may include Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q–k–1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code. Use of ECCs may enable a datum to be scanned, read, evaluated, and/or verified.

Figure 3:
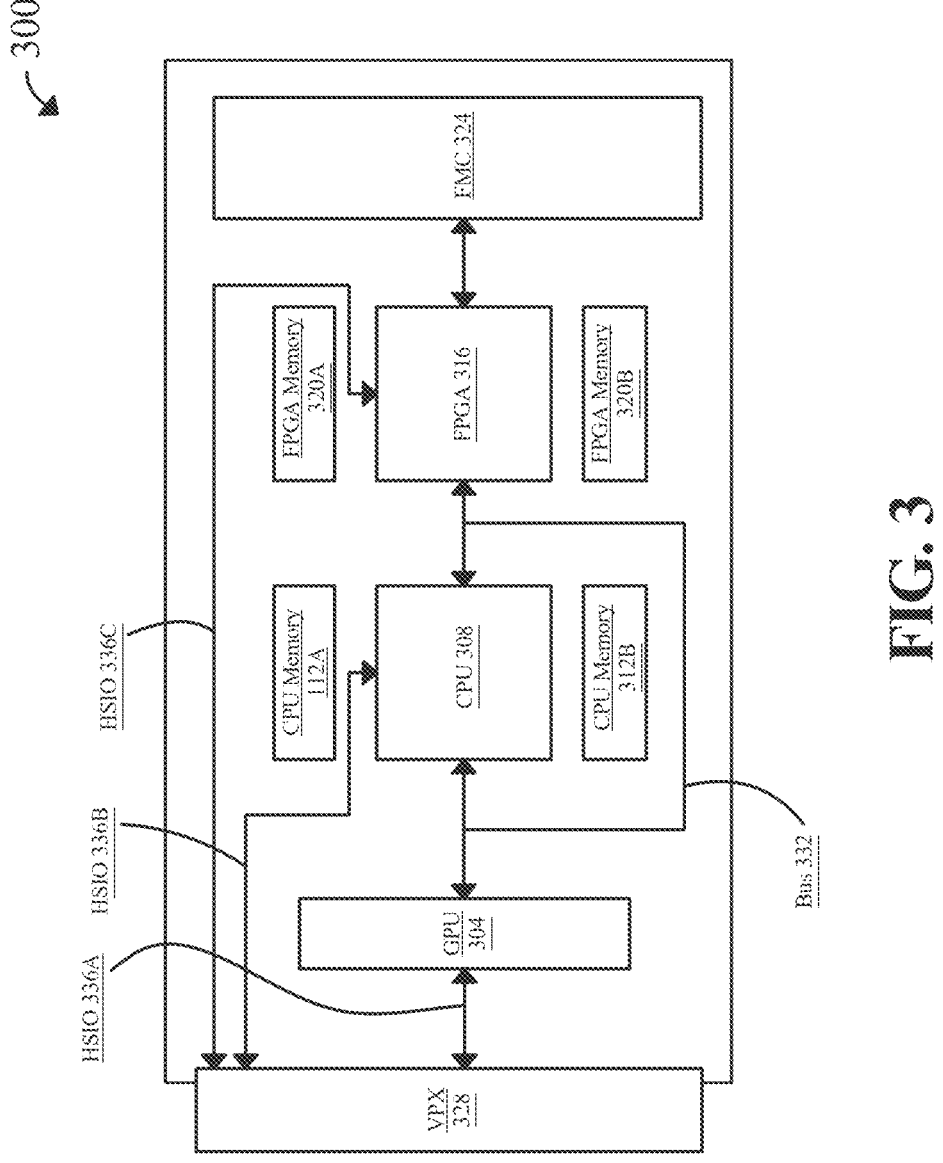
FIG. 3 is a block diagram of an exemplary embodiment of a system for isolated virtual environments.

Referring now to FIG. 3, an exemplary embodiment of a controller card is described. In some embodiments, controller card 300 may include a Graphics Processing Unit (GPU) 304. GPU 304 may include a type of computer chip often used for graphics related tasks such as 3D rendering. In some embodiments, GPU 304 may contain more, smaller, and more specialized cores than a typical CPU, allowing it to run larger sets of functions at once. In addition to 3D rendering, GPU 304 may also be used for other functions, such as those in which operations must be performed on large matrices of data. In non-limiting examples, GPU 304 may have applications in cryptography and machine learning.

Still referring to FIG. 3, in some embodiments, GPU 304 may use a system on a module (SOM) design. In some embodiments, a SOM GPU may include NVIDIA Jetson NX or Google Coral. In some embodiments, a GPU may use a Chip Down Design.

Still referring to FIG. 3, in some embodiments, controller card 300 may include a GPU dedicated memory. A dedicated memory may be physically closer to GPU 304 and may be configured for fast and/or efficient access by GPU 304. In some embodiments, a dedicated memory for GPU 304 may include persistent memory. In some embodiments, a dedicated memory for GPU 304 may include temporary memory. In some embodiments, inclusion of a dedicated memory for GPU 304 may improve the efficiency of controller card 300 in comparison to retrieval of information from a general-purpose memory. Optionally, a dedicated memory for GPU 304 may include 72 bit DDR4 memory. In some embodiments, GPU dedicated memory may be accessible only by GPU 304. In some embodiments, GPU dedicated memory may be accessible by GPU 304, CPU 308, and/or FPGA 316.

Still referring to FIG. 3, in some embodiments, controller card 300 may include Central Processing Unit (CPU) 308. CPU 308 may include a general-purpose computer processor. CPU 308 may include a Reduced Instruction Set Computer (RISC) processor. In some embodiments, RISC processors may include less complicated functions than a Complex Instruction Set Computer (CISC). In some embodiments, this may allow individual instructions to be performed more quickly on a RISC processor than a CISC processor. Exemplary embodiments of CPUs are described in further detail below with reference to FIG. 2.

Still referring to FIG. 3, in some embodiments, controller card 300 may include CPU dedicated memory, such as CPU dedicated memory 312A and 312B. In some embodiments, CPU dedicated memory 312A and/or 312B may include persistent memory. In some embodiments, CPU dedicated memory 312A and/or 312B may include temporary memory. In some embodiments, inclusion of CPU dedicated memory 312A and/or 312B may improve the efficiency of controller card 300 in comparison to retrieval of information from a general-purpose memory. In some embodiments, CPU dedicated memory 312A and/or 312B may include ECC memory. In some embodiments, CPU dedicated memory 312A and/or 312B may include 72 bit DDR4 memory. In some embodiments, CPU dedicated memory 312A and/or 312B may be accessible only by CPU 308. In some embodiments, CPU dedicated memory 312A and/or 312B may be accessible by GPU 304, CPU 308, and/or FPGA 316.

Still referring to FIG. 3, in some embodiments, controller card 300 may include Field Programmable Gate Array (FPGA) 316. FPGA 316 may include a chip that may be programmed and/or reprogrammed after manufacturing. FPGA 316 may include a series of registers and logic gates. In some embodiments, FPGA 316 registers may be turned on and off in order to program FPGA 316. This may be used to, for example, run a specific algorithm many times using hardware rather than software instructions. In some embodiments, once configured, FPGA 316 may perform processing functions much faster than software instruction solutions. In some embodiments, FPGA 316 may include a KINTEX UltraSCALE FPGA. In some embodiments, FPGA 316 may include an Intel Agilex 7 FPGA F-Series.

Still referring to FIG. 3, in some embodiments, controller card 300 may include an FPGA dedicated memory, such as FPGA dedicated memory 320A and 320B. In some embodiments, FPGA dedicated memory 320A and/or 320B may include persistent memory. In some embodiments, FPGA dedicated memory 320A and/or 320B may include temporary memory. In some embodiments, inclusion of FPGA dedicated memory 320A and/or 320B may improve the efficiency of controller card 300 in comparison to retrieval of information from a general-purpose memory. In some embodiments, FPGA dedicated memory 320A and/or 320B may include ECC memory. In some embodiments, FPGA dedicated memory 320A and/or 320B may include 72 bit DDR4 memory. In some embodiments, FPGA dedicated memory 320A and/or 320B may be accessible only by FPGA 316. In some embodiments, FPGA dedicated memory 320A and/or 320B may be accessible by GPU 304, CPU 308, and/or FPGA 316.

Still referring to FIG. 3, in some embodiments, controller card 300 may include FPGA Mezzanine Card (FMC) 324. In some embodiments, FMC 324 may be used to transfer data in and/or out of FPGA 316. In some embodiments, FMC 324 may connect to an external computing device. In a non-limiting example, controller card 300 may receive instructions and/or other data through FMC 324. In another non-limiting example, controller card 300 may output data through FMC 324. FMC 324 may conform to FMC standards.

Still referring to FIG. 3, in some embodiments, controller card 300 may include Virtual Path Cross-Connect (VPX) module 328. VPX module 328 may conform to VPX standards. VPX module 328 may be used for input and/or output of signals from controller card 300. VPX module 328 may be communicatively connected to an external computing device and/or an external component of a computing device. VPX module 328 may include a 3 U VPX. VPX module 328 may include a 6 U VPX.

Still referring to FIG. 3, in some embodiments, controller card 300 may include control and data bus assembly 332. Control and data bus assembly 332 may connect GPU 304, CPU 308, and/or FPGA 316. Components connected by control and data bus assembly 332 may communicate using an API configured to enable the division of processing tasks between the FPGA, the CPU, and the GPU. In some embodiments, an API may allow code to run on varying hardware, such as GPU 304, CPU 308, and/or FPGA 316, rather than being limited to a particular hardware architecture. In some embodiments, different computing tasks may be performed more efficiently on different architectures. For example, a first computing task may be performed more efficiently on GPU 304, a second computing task may be performed more efficiently on CPU 308, and a third computing task may be performed more efficiently on FPGA 316. In another example, a computing task may have multiple components which may be split between GPU 304, CPU 308, and FPGA 316 such that all available processing power is used. In some embodiments, inclusion of GPU 304, CPU 308, and FPGA 316, and division of computing tasks between them, may provide improvements to speed and/or efficiency of controller card 300.

Still referring to FIG. 3, in some embodiments, GPU 304, CPU 308, and/or FPGA 316 may be configured such that they are capable of running code specific to their architecture. This capability may be in addition to API based programming.

Continuing to refer to FIG. 3, GPU 304, CPU 308, and/or FPGA 316 and/or other components of apparatus may connect to input and/or output devices, via any suitable I/O ports. Examples of an input devices include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input devices may be interfaced to any virtual and/or physical data or control bus as described herein via any of a variety of interfaces including, but not limited to, a serial interface, a parallel interface, a game port, a USB interface, a FIRE-WIRE interface, a direct interface to bus, and any combinations thereof. Input devices may include a touch screen interface that may be a part of or separate from displays and may be utilized as a user selection device for selecting one or more graphical representations in a graphical interface as described above. I/O devices and/or ports may alternatively or additionally connect to and/or interface with storage device (e.g., a removable disk drive, a flash drive, etc.) and/or network interface device. A network interface device may be utilized for connecting apparatus and/or components thereof to one or more of a variety of networks, and one or more remote devices connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used.

Output devices may include, without limitation, display devices. Examples of a display device include, but are not limited to, a liquid crystal display (LCD), a cathode ray tube (CRT), a plasma display, a light emitting diode (LED) display, and any combinations thereof. Display adapters and display devices may be utilized in combination with CPU, GPU, and/or FPGA elements of apparatus to provide graphical representations of aspects of the present disclosure. In addition to a display device, apparatus may include one or more other peripheral output devices including, but not limited to, an audio speaker, a printer, and any combinations thereof. Such peripheral output devices may be connected to a bus via a peripheral interface. Examples of a peripheral interface include, but are not limited to, a serial port, a USB connection, a FIREWIRE connection, a parallel connection, and any combinations thereof.

Still referring to FIG. 3, in some embodiments, controller card 300 may include one or more High Speed Input/Output (HSIO) connections, such as HSIO connections 336A, 336B, and 336C. In some embodiments, HSIO connection 336A may connect GPU 304 with VPX 328. In some embodiments, HSIO connection 336B may connect CPU 308 with VPX 328. In some embodiments, HSIO connection 336C may connect FPGA 316 with VPX 328.

Still referring to FIG. 3, in some embodiments, controller card 300 may be communicatively connected to an external computing device and/or a component of an external computing device. In some embodiments, controller card 300 may provide additional computing power to an external computing device. In some embodiments, controller card 300 may be used to tasks in signal processing, communication, machine learning, graphics rendering, cryptography, and the like.

Still referring to FIG. 3, in some embodiments, one or more applications may be run on controller card 300. In some embodiments, one or more applications may be run on controller card 300 using the same operating system. For example, all applications of a plurality of applications may run using the same operating system. In some embodiments, virtual machines and/or partitions may be used to separate processing power and/or memory of controller card 300. In some embodiments, one or more applications may be isolated from one or more other applications through the use of partitions and/or virtual machines. In some embodiments, separation of applications may prevent them from interfering with each other, for example, by one application using excessive amounts of processing power, causing another application to run more slowly. In some embodiments, separation of applications may prevent applications from making full use of available resources such as memory or processing power.

Still referring to FIG. 3, in some embodiments, one or more mission critical applications may run on controller card 300. Apparatus 100 may be configured such that applications may be prioritized, and memory and/or processor cores may be allocated as a function of this prioritization. In some embodiments, an application may be deemed mission critical and/or high priority and may have greater access to memory and/or processor cores based on this categorization. For example, an amount of processor cores and/or memory necessary to complete a task within certain parameters (such as within a certain time frame) may be estimated for an application. One or more such estimates may be made. For example, a first estimate designed to have the highest probability of accuracy may be made, and a second estimate designed to represent a worst case scenario of resource usage may be made. In this example, a low priority application may be allocated memory and/or processor cores based on a first estimate, while a high priority application may be allocated memory and/or processor cores based on a second estimate. In some embodiments, which processor cores are allocated to which application may be determined as a function of application priority. For example, if a high priority application and a low priority application both run optimally using CPU cores, then available CPU cores may be allocated to the high priority application before the low priority application. In some embodiments, controller card 300 may be configured such that a low priority application may be moved off of a processor core in order to make room for a high priority application.

Still referring to FIG. 3, in some embodiments, multithreading, multiprocessing, and/or symmetric multiprocessing may be used to improve processing times. In some embodiments, multithreading may allow multiple threads to be executed on a processor core concurrently. Multiprocessing may involve the use of multiple processing cores to perform a computing task. Symmetric multiprocessing may include the use of multiple processor cores to perform a single task, where the cores utilize the same memory and operating system. A plurality of identical cores may be used in symmetric multiprocessing. For example, multiple GPU cores may be used in a symmetric multiprocessing task. In another example, multiple CPU cores may be used in a symmetric multiprocessing task.

Still referring to FIG. 3, in some embodiments, controller card 300 may be configured to initiate a secure boot process when controller card 300 and/or a computing device communicatively connected to controller card 300 is powered on or restarted. In some cases, controller card 300 may include a trusted platform module (TPM), wherein the "trusted platform module," for the purpose of this disclosure, is a specialized chip on an endpoint hardware component (i.e., device) that store keys e.g., cryptographic keys such as encryption keys, decryption keys, public keys, private keys, or any key as described herein. In a non-limiting example, controller card 300 may include a plurality of TPMs, each contain an RSA key pair known as "Endorsement key (EK)," wherein the RSA key pair may be maintained inside of a TPM and cannot be accessed by non-secure software. In some cases, a first partition may include a bootloader (i.e., the first piece of software that runs). In some cases, bootloader may be verified, for example, one or more controller card 300 firmware may be configured to check bootloader's digital signature before execution using keys e.g., public keys stored in TPM or another secure component. In case where bootloader's signature doesn't match, controller card 300 may halt, preventing potential malicious partitions from running. Once bootloader is verified and executed, a hypervisor may be instantiated. In some cases, a hypervisor may also be verified through an associated digital signature to ensure its authenticity. In a non-limiting example, controller card 300 may boot only with trusted and authenticated partitions e.g., a primary partition and plurality of child partitions. Child partitions may be verified before loading, or trusted version of second partition may be loaded. Hypervisor may be configured to prevent any child partition that yield a negative response during verification. In some cases, all events during the secure boot process as described herein, including, without limitation, any verification failures or anomalies, can be communicated to primary partition through virtual bus. In some cases, these events may be alerted to certain users e.g., administrators. Additionally, or alternatively, in cases where verification fails, controller card 300 may be configured to boot into a safe mode, attempting to restore a trusted software version, or simply halting a processor and/or primary partition to prevent potential threats.

Still referring to FIG. 3, in some embodiments, data stored on controller card 300 may be protected by one or more security measures. Security measures may include, in non-limiting examples, storage in a database, password protection, multi factor authentication, hashing, encryption, digital signatures, inclusion in a blockchain, and the like. Cryptographic systems and blockchain are described further herein.

An apparatus, method, or software described herein may be consistent with any apparatus, method, or software disclosed in U.S. patent application Ser. No. 18/395,149, filed on Dec. 22, 2023, and titled "APPARATUS AND METHOD FOR PROVIDING A SAFETY-CRITICAL OPERATING ENVIRONMENT (SCOE)," U.S. patent application Ser. No. 18/395,210, filed on Dec. 22, 2023, and titled "SYSTEM AND METHOD FOR A SAFETY CRITICAL OPERATING ENVIRONMENT CONTAINER ARCHITECTURE," the entirety of each of which is hereby incorporated by reference.

Figure 4:
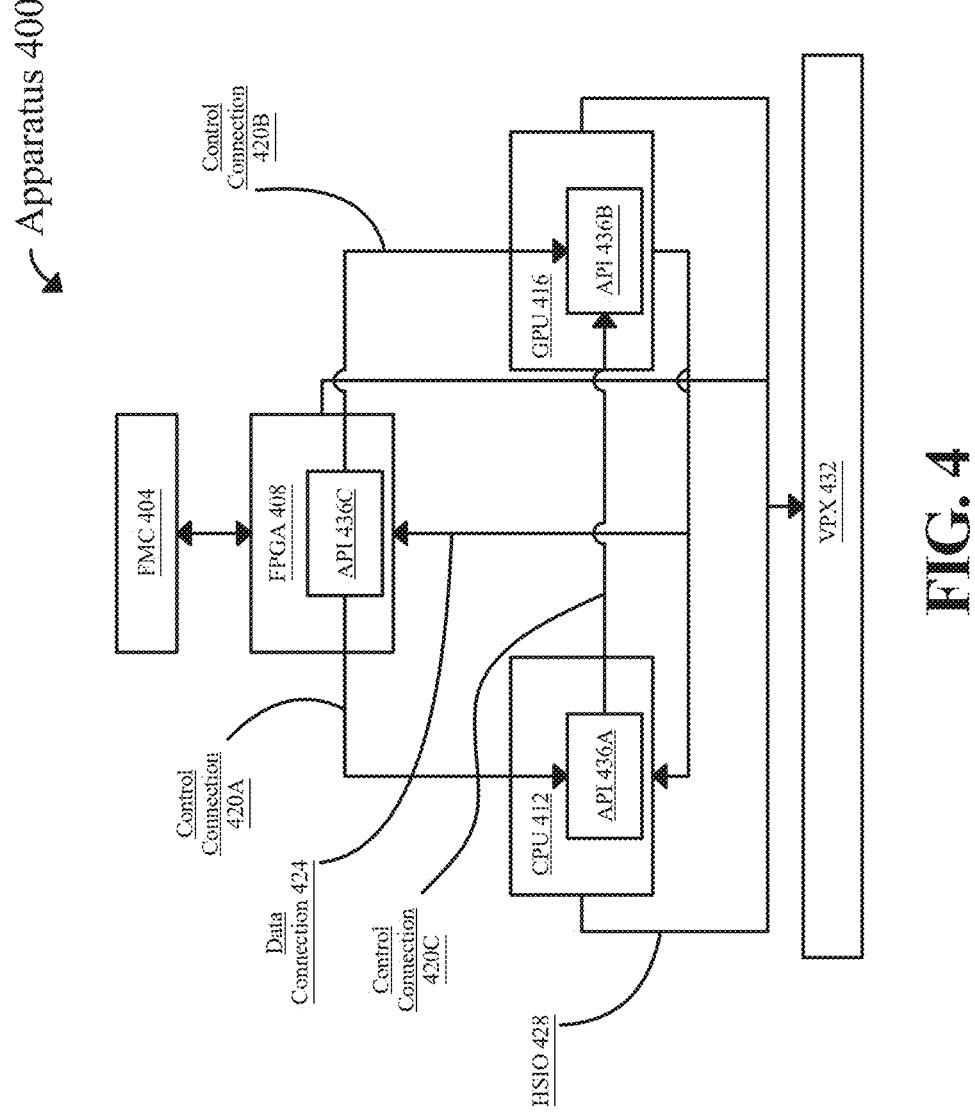
FIG. 4 is a block diagram depicting an exemplary bus and control assembly including an API.

Now referring to FIG. 4, an exemplary embodiment of apparatus 400 for bus communication is provided. Apparatus 400 may include FMC 404 communicatively connected to FPGA 408. Apparatus 400 may also include CPU 412, GPU 416, and control connections between FPGA 408, CPU 412 and/or GPU 416. Such control connections may include control connection 420A from FPGA 408 to CPU 412, control connection 420B from FPGA 408 to GPU 416, and/or control connection 420C from CPU 412 to GPU 416. Apparatus 400 may also include data connection 424 from GPU 416 to CPU 412 and/or FPGA 408. Apparatus 400 may also include HSIO connection 428. HSIO connection 428 may transfer data between VPX 432, CPU 412, FPGA 408, and/or GPU 416. In some embodiments, CPU 412 may include API 436A, GPU 416 may include API 436B, and FPGA 408 may include API 436C. In some embodiments, APIs 436A, 436B, and 436C may each accept the same inputs. In some embodiments, APIs 436A, 436B, and 436C may each be used to interpret code using the APIs such that they may be executed on hardware to which the processing task is assigned.

Figure 5:
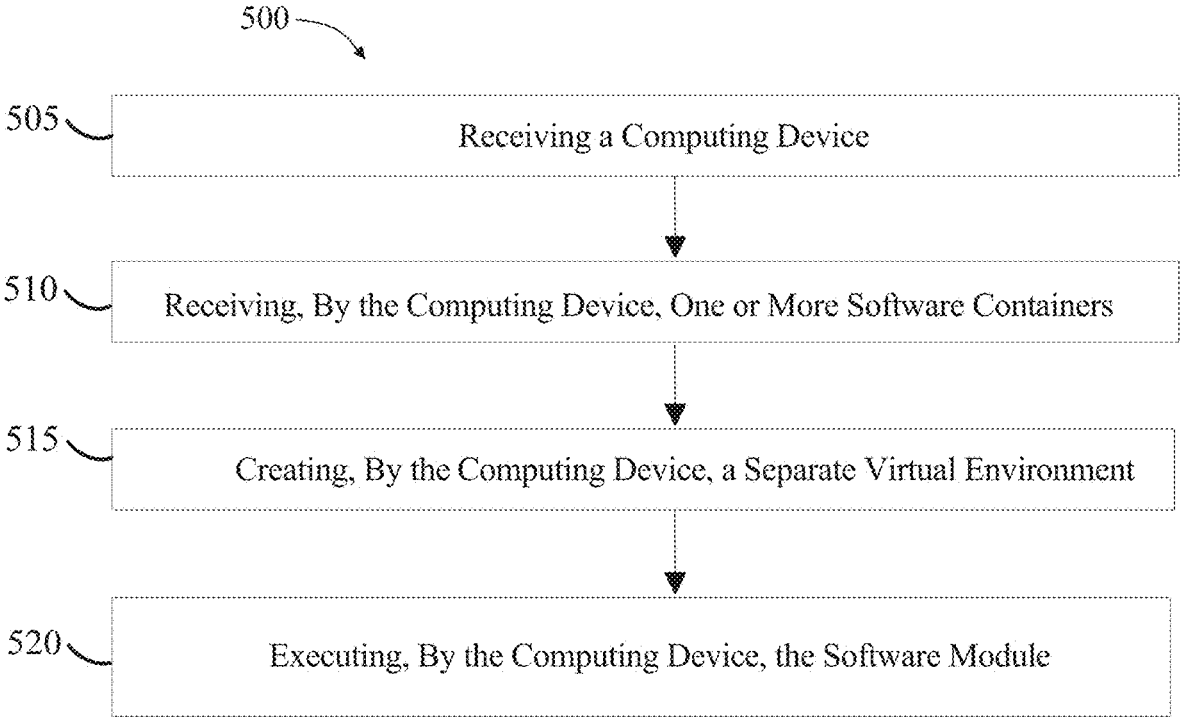
FIG. 5 is a flow diagram illustrating an exemplary embodiment of a method for generation of one or more isolated virtual environments.

Referring now to FIG. 5, an exemplary embodiment of a method 500 of isolated virtual environments is illustrated. At step 505, a computing device is received; this may be implemented, without limitation, as described above in reference to FIGS. 1-4. Computing device may include any apparatus and/or computing system or platform as described above. For instance, and without limitation, computing device may include at least a primary processor and at least a host memory communicatively connected to the at least a primary processor. Computing device may include a controller card, which may include a plurality of embedded processors and a dedicated memory communicatively connected to the plurality of embedded processors.

At step 510, and continuing to refer to FIG. 5, computing system creates one or more virtual machines by isolating at least one of the plurality of embedded processors and at least one of the plurality of dedicated memory for each virtual machine; this may be implemented, without limitation, as described above in reference to FIGS. 1-4.

At step 515, and still referring to FIG. 5, computing system generates a separate virtual environment within each virtual machine; this may be implemented, without limitation, as described above in reference to FIGS. 1-4.

At step 520, and with further reference to FIG. 5, computing device deploys at least one software container within each of the one or more virtual machines; this may be implemented, without limitation, as described above in reference to FIGS. 1-4.

Figure 6:
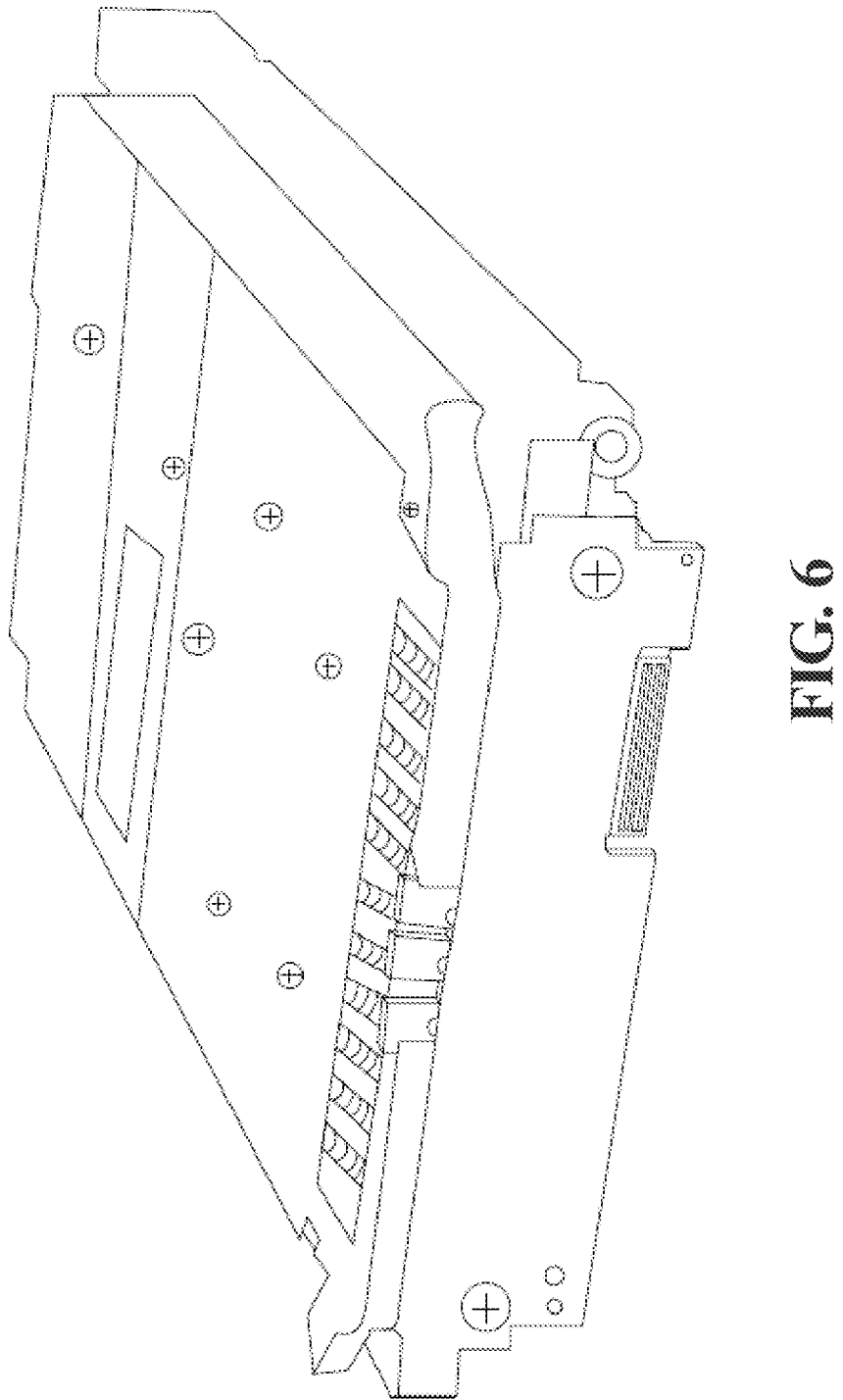
FIG. 6 is a schematic diagram illustrating a housing.

Referring now to FIG. 6, apparatus may include and/or components thereof be incorporated in a housing. Housing 600 may be composed of any suitable material or combination of materials, including without limitation metal such as steel, aluminum, titanium or the like, natural and/or artificial polymer materials such as plastic and/or rubbers, or the like. Housing 600 may be anodized, coated by processes such as spray coating, power coating, electroplating, or the like, and/or otherwise subjected to any suitable surface treatment. In some embodiments, housing 600 may include one or more heat transfer elements (not shown) including without limitation a heat pipe and/or one more thermally conductive elements running from circuit elements of apparatus 100 to edges thereof and/or to a computing device to which apparatus 100 is electrically and/or communicatively connected as described above; such computing device may thermally conduct heat away from housing 600 and/or apparatus 100 and/or dispose of such heat using cooling systems of such device.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A hardware apparatus for isolated virtual environments comprising:
    a plurality of embedded processor and memory pairs comprising:
        a graphics processing unit comprising a first dedicated memory and a first plurality of processing cores;
        a central processing unit comprising a second dedicated memory and a second plurality of processing cores; and
        a field programmable gate array comprising a third dedicated memory;
        a control and data bus assembly connecting the field programmable gate array, the central processing unit, and the graphics processing unit; and
        a hypervisor located on a non-volatile memory of the hardware apparatus, the hypervisor configured to:
            select, using a fixed allocated application program interface comprising an allocation machine learning model, an embedded processor and memory pair of the plurality of embedded processor and memory pairs for software to be executed,
                wherein the allocation machine learning model selects the embedded processor and memory pair as a function of at least a performance metric and a safety-criticality metric associated with the software to be executed, wherein the safety-criticality metric indicates that the software to be executed is either safety-critical or non-safety critical, and wherein the allocation learning model:

determines an anticipated performance metric for each embedded processor and memory pair of the plurality of embedded processor and memory pairs for the software to be executed based on training data; and determines that the software must be allocated to a singular embedded processor and corresponding unpartitioned dedicated memory as a function of an indication that the software is safety-critical;

allocate the software to a singular embedded processor and corresponding unpartitioned dedicated memory based on an anticipated performance metric associated with the singular embedded processor and corresponding unpartitioned dedicated memory; and run the software on the selected embedded processor and memory pair.

2. The hardware apparatus of claim 1, wherein the plurality of embedded processor and memory pairs comprises a plurality of heterogenous processing components.

3. The hardware apparatus of claim 1, wherein the plurality of embedded processor and memory pairs comprise a plurality of heterogenous memory components.

4. The hardware apparatus of claim 1, wherein the hardware apparatus comprises a host operating system.

5. The hardware apparatus of claim 1, wherein the hypervisor comprises a type 1 hypervisor.

6. The hardware apparatus of claim 1, wherein the hardware apparatus further comprises a controller card.

7. The hardware apparatus of claim 6, wherein controller card comprises a field replaceable unit.

8. A method for generation of isolated virtual environments comprising:

receiving a computing device, the computing device comprising:

a plurality of embedded processor and memory pairs comprising:

a graphics processing unit comprising a first dedicated memory and a first plurality of processing cores;

a central processing unit comprising a second dedicated memory and a second plurality of processing cores; and a field programmable gate array comprising a third dedicated memory; and a control and data bus assembly connecting the field programmable gate array, the central processing unit, and the graphics processing unit;

selecting, using a hypervisor located on a non-volatile memory of the computing device, a fixed allocated application program interface and an allocation machine learning model, an embedded processor and memory pair of the plurality of embedded processor and memory pairs, wherein the allocation machine learning model selects the embedded processor and memory pair as a function of at least a performance metric and a safety-criticality metric associated with software to be executed, wherein the safety-criticality metric indicates that the software to be executed is either safety-critical or non-safety critical, and wherein the allocation learning model:

determines an anticipated performance metric for each embedded processor and memory pair of the plurality of embedded processor and memory pairs for the software to be executed based on training data; and determines that the software must be allocated to a singular embedded processor and corresponding unpartitioned dedicated memory as a function of an indication that the software is safety-critical;

allocating, using the hypervisor located on the non-volatile memory of the computing device, the software to a singular embedded processor and corresponding unpartitioned dedicated memory based on an anticipated performance metric associated with the singular embedded processor and corresponding unpartitioned dedicated memory; and running, using the hypervisor, the software on the selected embedded processor and memory pair.

9. The method of claim 8, wherein the plurality of embedded processor and memory pairs comprises a plurality of heterogenous processing components.

10. The method of claim 8, wherein the plurality of embedded processor and memory pairs comprise a plurality of heterogenous memory components.

11. The method of claim 8, wherein the computing device comprises a host operating system.

12. The method of claim 8, wherein the hypervisor comprises a type 1 hypervisor.

13. The method of claim 8, wherein the computing device further comprises a controller card.

14. The method of claim 8, wherein the computing device further comprises a field replaceable unit.

15. A hardware apparatus for isolated virtual environments comprising:

a plurality of embedded processor and memory pairs comprising:

a graphics processing unit comprising a first dedicated memory and a first plurality of processing cores;

a central processing unit comprising a second dedicated memory and a second plurality of processing cores; and a field programmable gate array comprising a third dedicated memory;

a control and data bus assembly connecting the field programmable gate array, the central processing unit, and the graphics processing unit; and a hypervisor located on a non-volatile memory of the hardware apparatus, the hypervisor configured to:

select, using a fixed allocated application program interface comprising an allocation machine learning model, a first embedded processor and memory pair of the plurality of embedded processor and memory pairs for software to be executed, wherein the allocation machine learning model selects the first embedded processor and memory pair as a function of at least a performance metric and a safety-criticality metric associated with software to be executed, wherein the safety-criticality metric indicates that the software to be executed is either safety-critical or non-safety critical, and wherein the allocation learning model:

determines an anticipated performance metric for each embedded processor and memory pair of the plurality of embedded processor and memory pairs for the software to be executed based on training data; and determines that the software must be allocated to a singular embedded processor and corresponding unpartitioned dedicated memory as a function of an indication that the software is safety-critical;

allocating, using the hypervisor located on the non-volatile memory of a computing device, the software to a singular embedded processor and corresponding unpartitioned dedicated memory based on an anticipated performance metric associated with the singular embedded processor and corresponding unpartitioned dedicated memory;

run the software on the first embedded processor and memory pair; and run a second virtual machine on the second embedded processor and memory pair;

wherein the software runs on the first embedded processor and memory pair and the second virtual machine runs on the second embedded processor and memory pair.

16. The hardware apparatus of claim 15, wherein the first virtual machine and the second virtual machine have different operating systems.

* * * * *